March 17, 1970     H. M. LEWIS     3,500,744
IN-LINE CARRIAGE ARRANGEMENT FOR EMBOSSING MACHINES
Filed Aug. 17, 1967     4 Sheets-Sheet 1

INVENTOR.
HARRY M. LEWIS
BY
Cushman, Darby & Cushman
ATTORNEYS

INVENTOR.
HARRY M. LEWIS
BY
Cushman, Darby & Cushman
ATTORNEYS

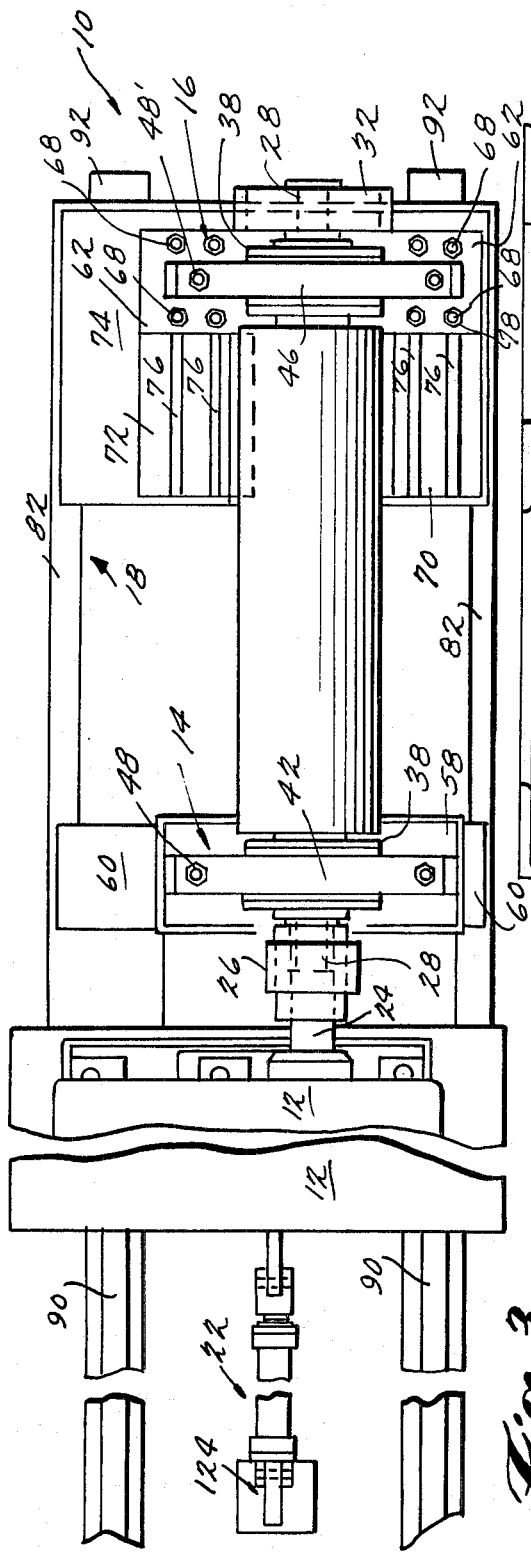
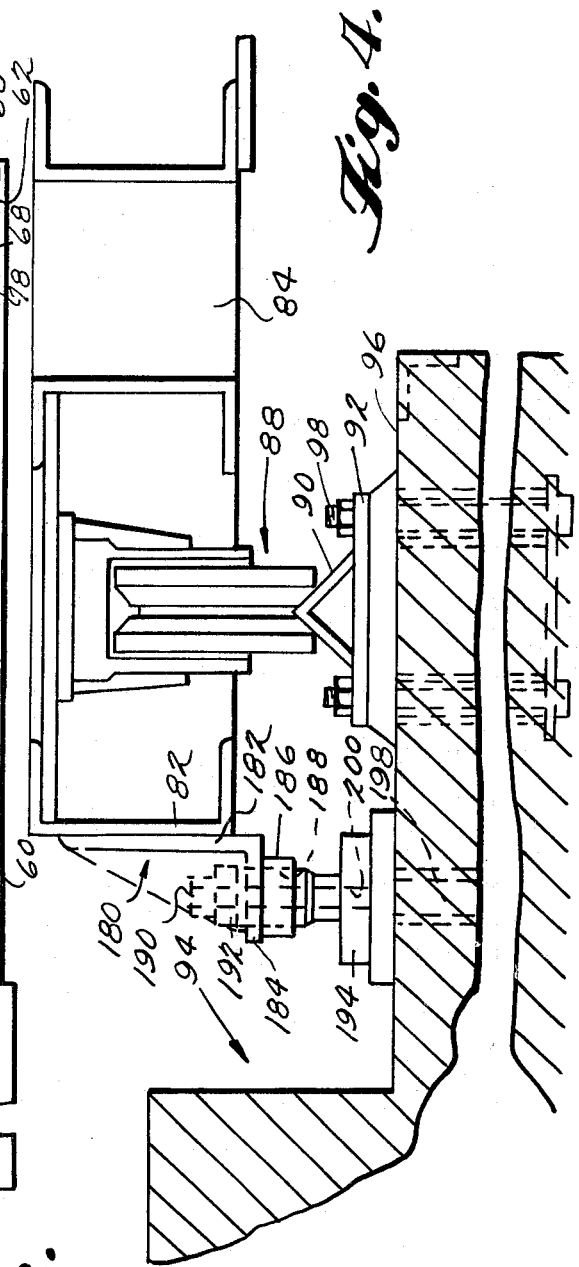

March 17, 1970 H. M. LEWIS 3,500,744
IN-LINE CARRIAGE ARRANGEMENT FOR EMBOSSING MACHINES
Filed Aug. 17, 1967 4 Sheets-Sheet 4

INVENTOR.
HARRY M. LEWIS
BY
Cushman, Darby & Cushman
ATTORNEYS

United States Patent Office 3,500,744
Patented Mar. 17, 1970

3,500,744
IN-LINE CARRIAGE ARRANGEMENT FOR
EMBOSSING MACHINES
Harry M. Lewis, Springfield, N.J., assignor to Modern
Engraving and Machine Corporation, Hillside, N.J.,
a corporation of New Jersey
Filed Aug. 17, 1967, Ser. No. 661,368
Int. Cl. B41f 13/44
U.S. Cl. 101—23                                    8 Claims

ABSTRACT OF THE DISCLOSURE

An embossing machine mounted on a carriage and having a headstock and a tailstock for carrying embossing rolls. The headstock and tailstock are adjustable, with respect to one another, in a direction parallel to the longitudinal axis of the embossing rolls so that different length rolls may be used on the embossing machine. The carriage is mounted on rails and is provided with two hydraulic cylinders or other types of prime movers which position the carriage relative to other machinery in the process line. One of the cylinders moves the carriage onto or off the process line, while the other cylinder adjusts the position of the carriage in the line so that the carriage is in the desired position relative to other machines in the process line regardless of the length of roll used in the embossing machine.

BRIEF DESCRIPTION OF THE INVENTION

The present invention relates to an embossing machine and, in particular, to an embossing machine mounted on a carriage and provided with means permitting rolls of various lengths to be mounted on the embossing machine in proper alignment with other machines in the process line.

The present invention comprises an embossing machine having a headstock and a tailstock on which are mounted the embossing rolls of the machine. The embossing machine is carried on a carriage with the headstock being rigidly secured to the carriage in a fixed position, while the tailstock is slidably mounted on the carriage in such a manner that the distance between the headstock and tailstock can be adjusted to accommodate rolls of differing lengths. A suitable prime mover such as a hydraulic piston and cylinder assembly is connected to the carriage and is utilized to adjust the position of the carriage and, consequently, the rolls of the embossing machine relative to other machines in the process line so as to maintain the headstock or the center lines of the rolls in a desired position relative to other machines in the process line. The type of prime mover utilized depends on the requirements of the particular process line and is in no way restricted to a hydraulic piston and cylinder assembly. For example, an electric motor could be geared down to a proper speed ratio to power the movement of the carriage through a rack and pinion arrangement or an overhead crane could be hooked to the carriage to power the movement of the carriage.

It is an object of the invention to provide an embossing machine that can be easily adjusted to accommodate sets of rolls of varying lengths so as to adapt the embossing machine to the particular embossing operation desired.

It is another object of the present invention to provide a machine which can be used with the bridle roll assembly disclosed in my copending application, filed concurrently herewith and entitled "Bridle Roll Assembly."

A further object of the present invention is to provide a means for quickly and easily adjusting the embossing machine so that the rolls of the embossing machines are properly aligned with other machines in the process line.

Other objects and advantages of the present invention will become more apparent from the following disclosure when taken in combination with the accompanying drawing in which:

FIGURE 3 is a plan view of the embossing machine;

FIGURE 4 is an enlarged view of a portion of the carriage showing the manner in which the carriage can be secured to the floor in a desired position;

DETAILED DESCRIPTION OF THE INVENTION

Figure 1:
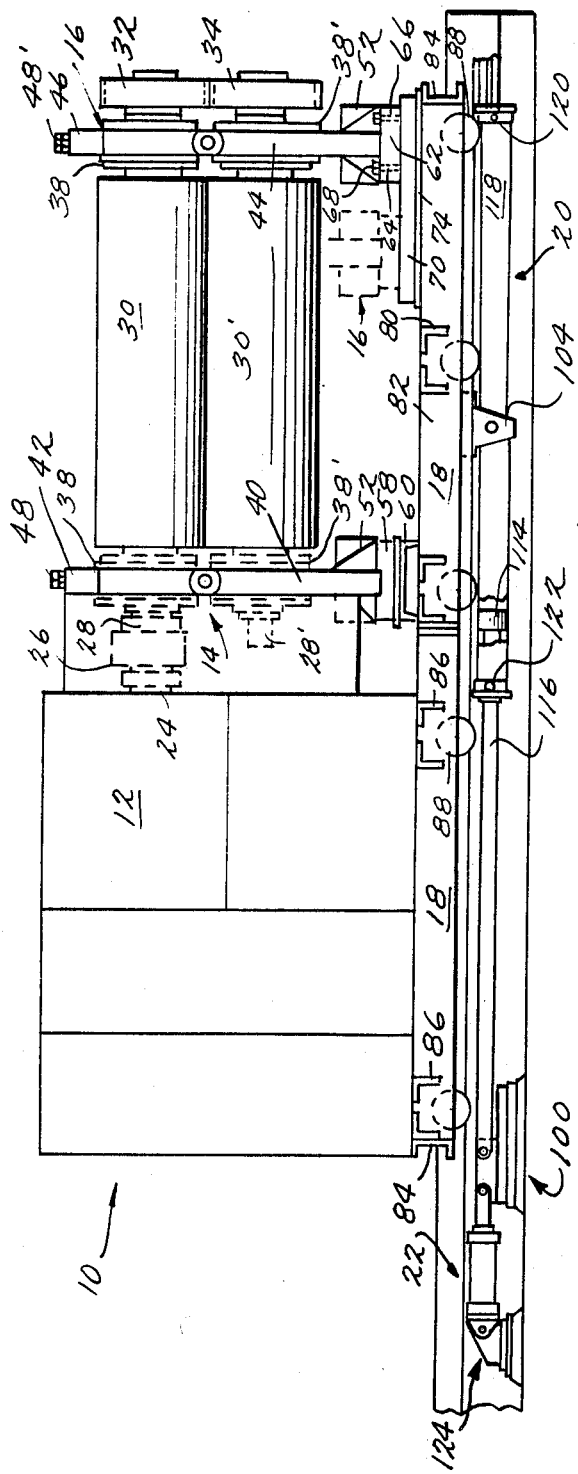
FIGURE 1 is an elevational view of the input side of the embossing machine of the present invention.

Referring to FIGURE 1, the embossing machine of the present invention 10 comprises a driving unit 12, a headstock 14, tailstock 16, carriage 18 and hydraulic cylinder assemblies 20 and 22. The driving unit 12 of the invention is a conventional drive unit and is not shown in detail since it does not comprise part of the present invention nor would details of the drive unit aid in the understanding of the present invention.

As shown in FIGURES 1 and 3, the drive shaft 24 of drive unit 12 is coupled by a conventional splined coupling 26 or other suitable means to axle 28 of the embossing roll 30. The other end of axle 28 is provided with a gear 32 which meshes with and drives gear 34 on axle 28' of embossing roll 30' whereby drive shaft 24 drives both embossing rolls.

Axle 28 of embossing roll 30 is rotatably mounted in bearing boxes 38 while axle 28' of embossing roll 30' is rotatably mounted in bearing boxes 38'. These bearing boxes are carried by the headstock 14 and tailstock 16 with bearing boxes 38 which support embossing roll 30 being mounted in fixed positions on the stocks and with bearing boxes 38' which support embossing roll 30' being slidably mounted on the stocks for reasons as will be explained hereinafter.

Figure 2:
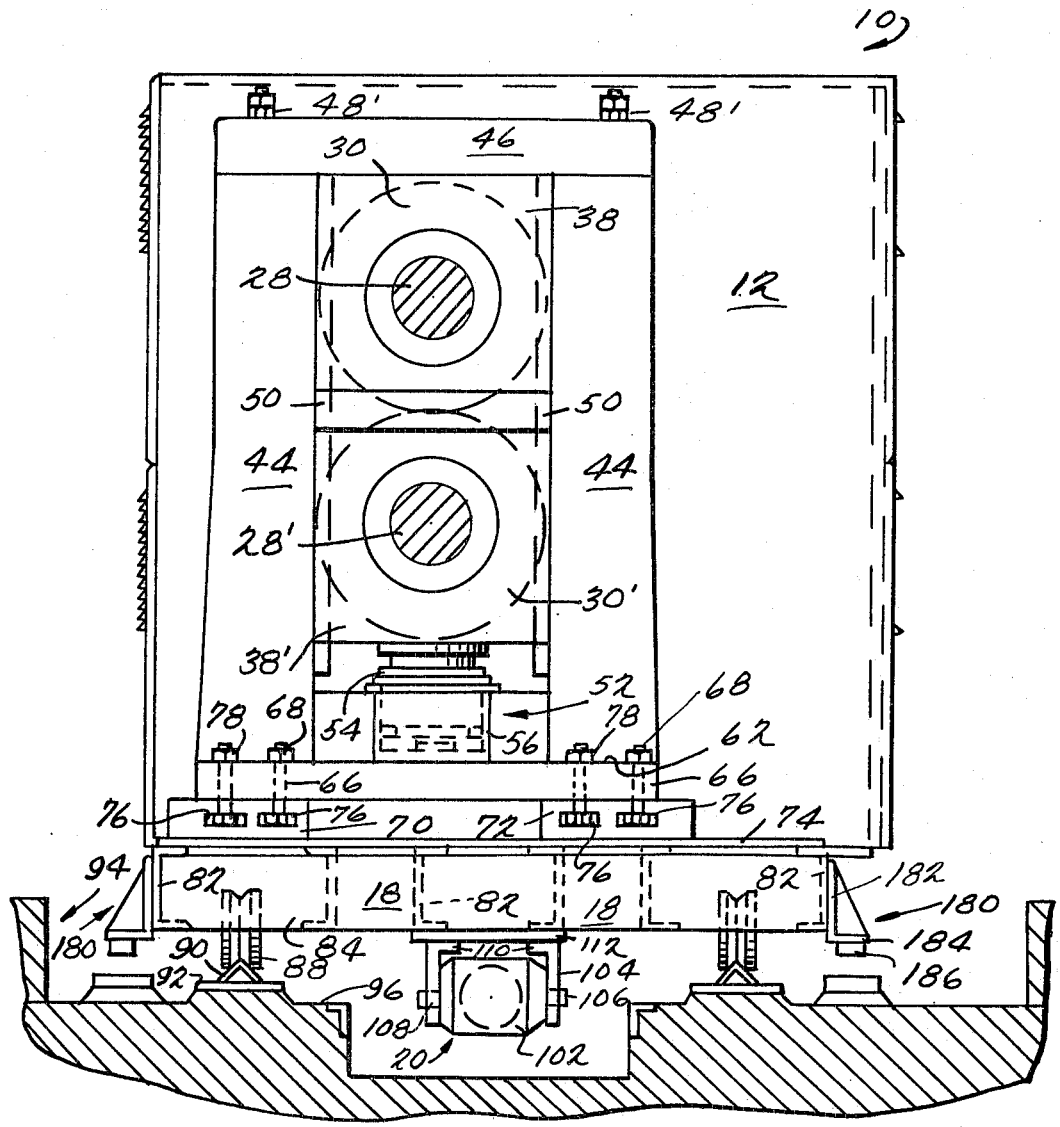
FIGURE 2 is an end view of the embossing machine showing the manner in which the tailstock is secured to the carriage.
Figure 5:
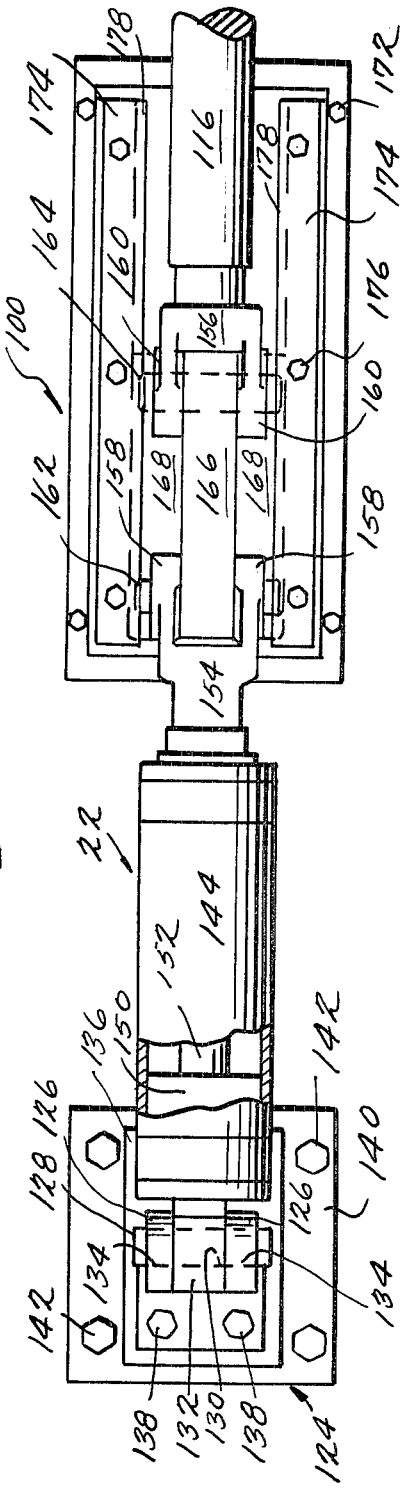
FIGURE 5 is an enlarged plan view of the cylinder for resetting the operating position of the embossing machine.
Figure 6:
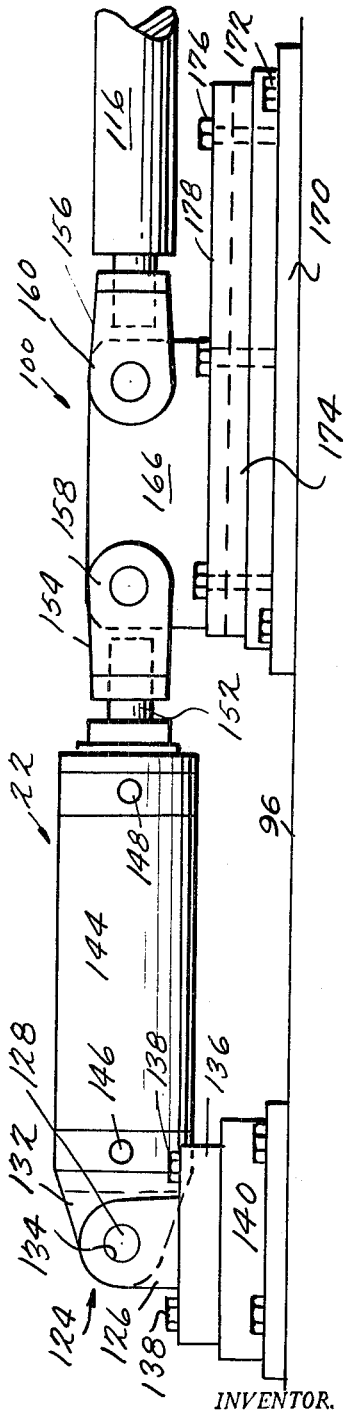
FIGURE 6 is a side view of the cylinder for resetting the operating position of the embossing machine.

Headstock 14 comprises spaced-apart vertical frame members 40 and an upper horizontal frame member 42 which is secured at its ends by bolts 48 to the upper ends of vertical frame members 40. Tailstock 16 also comprises spaced-apart vertical frame members 44 and an upper horizontal frame member 46 which is secured at its ends by bolts 48' to the upper ends of vertical frame members 44. The vertical frame members 40, 44 of the headstock and tailstock are each provided with elongated retaining elements 50 which, as shown in FIGURE 2, are slidably received in the lateral grooves of bearing boxes 38, 38' when the embossing rolls are mounted on the machine.

While bearing boxes 38 of embossing roll 30 are secured by conventional means in fixed positions to the headstock and tailstock, the positions of the lower bearing boxes 38', and consequently roll 30' is regulated by hydraulic assembly 52.

Both the headstock 4 and the tailstock 16 are provided with assemblies 52 which each comprise a piston 54 and a cylinder 56. Cylinders 56 are connected to a source of hydraulic fluid under pressure with the flow of hydraulic fluid to and from assemblies 52 being controlled through a conventional valving system (not shown) such as that disclosed in FIGURE 1 of the Sunderhauf et al., Patent No. 2,662,002, issued Dec 8, 1953.

The headstock 14 of the embossing machine has a lower horizontal frame member 58 that is welded, bolted or secured by other suitable means to both the vertical frame members 40 and a transverse channel member 60 of carriage 18. Channel member 60 is welded to the carriage 18 is a fixed position whereby the headstock of the embossing machine is also secured in a fixed position relative to the carriage 18.

Tailstock 16 is provided with a horizontal lower frame member 62 which is welded, bolted or secured in some other suitable manner to the lower end of vertical frame members 44. Horizontal frame member 62 is provided with a first pair of apertures 64 at each end on the inner side of the tailstock and a second pair of apertures 66 at each end on the outerside of the tailstock. Bolts 68 pass through these apertures and slidably secure the tailstock to the elongated members 70, 72 which are carried by the carriage 18.

Members 70 and 72 are welded or secured in some other suitable manner to plate 74 of carriage 18. Each member is provided with two elongated inverted T-shaped slots 76 which are aligned with apertures 64, 66 of horizontal frame member 62. The slots extend in a direction parallel to the longitudinal axis of embossing rolls 30, 30' with the heads of bolts 68 being received within slots 76, while the stems of the bolts extend from the slots and through apertures 64, 66 in horizontal frame member 66. The nuts 78 on bolts 68 can be loosened or tightened, as required, to enable frame member 62 and, consequently, tailstock 16 to be secured to the elongated members 70, 72 in any desired position along slots 76.

Carriage 18 comprises longitudinal channel members 82, transverse channel members 84 and angle brace members 86 which are welded or secured to each other in some other suitable manner at their joints. To facilitate and guide its movement when being positioned by hydraulic cylinder assemblies 20 and 22, carriage 18 is mounted on grooved wheels 88 or on V-type bronze shoes that ride on inverted V-shaped tracks 90. Tracks 90 are welded to elongated plates 92 that are, in turn, rigidly secured in a pit 94 to raised portions of the floor 96 by anchor bolts 98. While the use of wheels 88 or V-type shoes is contemplated, it is also contemplated that other devices can be used which will reduce the friction factor of carriage 18 relative to the inverted V-shaped tracks 90.

Hydraulic cylinder assemblies 20 and 22, or other types of prime movers, are provided to position carriage 18 and embossing machine 10 relative to the other machines in the process line. Assembly 20 is secured to carriage 18, while assembly 22 is anchored at one end to floor 96. The assemblies are interconnected by a coupling 100 which is connected to the piston rods of each assembly whereby actuation of either assembly causes carriage 18 to move along tracks 90.

Hydraulic cylinder assembly 20 is provided to move carriage 18 and embossing machine 10 onto or off of the process line. Assembly 20 is secured to carriage 18 by means of collar 102 and brackets 104. Collar 102 is rigidly secured to assembly 20 in a fixed position and has diametrically opposed, outwardly-extending rods 106 which are pivotally mounted in apertures 108 of brackets 104. Flanges 110 of brackets 104 are welded to plate 112 of carriage 18, thereby securely mounting assembly 20 on the underside of carriage 18.

The assembly comprises a piston 114 with a rod 116 and a cylinder 118 having inlet-exhaust ports 120 and 122 at each end thereof which communicate with the interior of the cylinder on opposite sides of piston 114. Ports 120 and 122 are connected to a supply of hydraulic fluid, under pressure, through conventional hydraulic lines and control valves (not shown) that regulate the flow of hydraulic fluid to and from opposite sides of the piston to position piston 114 within the cylinder.

Hydraulic cylinder assembly 22, which has a much shorter stroke than assembly 20, is provided to reset the position of the carriage, once it is on the process line, so that either the headstock 14 or the vertical center lines of embossing rolls 30, 30' will be properly aligned with other machines in the process line, regardless of the lengths of the embossing rolls mounted on the machine. Assembly 22 is connected at one end to an anchor bracket 124 having spaced-apart lugs 126 thereon. A pin 128 passes through aperture 130 in lug 132 of the assembly and aligned apertures 134 of spaced-apart lugs 126, thereby pivotally connecting the assembly 22 to anchor bracket 124. The plate 136 of the anchor bracket 124 is secured by bolts 138 to base 140 which is rigidly anchored to the floor by bolts 142.

The cylinder 144 of assembly 22 is provided with inlet-exhaust ports 146 and 148 which communicate with the interior of the cylinder on opposite sides of piston 150. Ports 146 and 148 are connected to a suitable source of hydraulic fluid, under pressure, by means of conventional hydraulic lines and control valves (not shown) which regulate the flow of hydraulic fluid to and from the cylinder. The positions of piston 150, which sealingly and slidably engages the interior surface of cylinder 144, and piston rod 152 are controlled by this conventional hydraulic system.

Piston rods 116 and 152 are each provided with coupling elements 154, 156 which are threadedly secured to the outer ends of the respective rods. Coupling elements 154 and 156 each comprise two spaced-apart lugs 158 and 160, respectively, which are secured to opposite ends of coupling 100 by means of pins 162 and 164 which pass through aligned apertures in the lugs 158, 160 and coupling 100.

Coupling 100 has a vertical portion 166, which is secured to coupling elements 154, 156, and a pair of lateral flanges 168 extending outwardly in a common horizontal plane from the lower edge of the vertical portion. The coupling 100 is slidably mounted on a base plate 170 that is secured to the floor 96 by bolts 172. Base plate 170 is provided with two elongated retaining elements 174 having L-shaped cross-sections. These retaining elements 174 are secured by bolts 176 to base plate 170 along the lateral edges thereof, with flange 178 of each element extending inwardly and spaced above base plate 170. The lower surfaces of flanges 178 engage the upper surfaces of flanges 168, thereby slidably retaining coupling 100 on base plate 170.

Carriage 18 is provided with brackets 180 having vertically-extending arms 182, which are welded to the sides of carriage 18, and horizontally-extending arms 184 having bosses 186 welded to their bottom surfaces. A vertically-extending aperture 188 passes through each arm 184 and boss 186. Each aperture 188 receives a bolt 190, enclosed within a sleeve 192, with the lower end of the bolt being received in threaded apertures 200 of plate 194 when the carriage is in a desired position. Plates 194 are anchored to floor 96 by studs or bolts 198 that are welded to the bottom surface of the plates. The above arrangement permits the carriage to be securely anchored in a fixed position, once the desired location of the carriage has been obtained, through the use of hydraulic cylinder 20 or 22.

When it is desired to substitute rolls of a different length for embossing rolls already in the headstock and tailstock of the embossing machine, axle 28 is uncoupled from drive shaft 24, upper horizontal frame members 42 and 46 are removed from the headstock and tailstock, respectively, and bearing boxes 38 are released from their fixed positions. The bearing boxes 38, 38' and, consequently, the rolls 30, 30' can then be removed from the embossing machine by sliding the bearing boxes upward along retaining elements 50 until they clear the top of the headstock and tailstock. Bolts 68, which secure lower horizontal frame members 62 to elongated members 70 and 72, may then be loosened and the tailstock moved along members 70, 72 to a new position which is determined by the length of the new embossing rolls being mounted on the machine. The bearing boxes 38, 38' of the new embossing rolls are then mounted on the headstock and tailstock; axle 28, of the upper embossing roll, is coupled to the drive shaft 24, upper horizontal frame members 42, 46 are bolted to the vertical frame members 40, 44; and bolts 68 are tightened to rigidly secure the tailstock in place.

After this has been done, the hydraulic cylinder 22 can be actuated to move carriage 18 either to the right or the left depending on the alignment desired between the embossing rolls 30, 30' and other machines in the process line. The position of the embossing machine can be regulated so as to maintain the headstock of the embossing machine in a desired alignment with the other machines of the process line, or to maintain the center lines of the embossing rolls in proper alignment with the other machines in the process line. Once the embossing machine is in the desired position, the carriage 18 can be anchored in place by bolts 190 which cooperate with brackets 180 of carriage 18 and threaded spaced-apart apertures 200 of plate 194.

Hydraulic assembly 20, which can have a stroke of approximately nine feet, is utilized to move carriage 18 and the embossing machine onto or off of the process line; while hydraulic cylinder 22, which can have a stroke of approximately eleven inches, is utilized for the more accurate adjustment of resetting the embossing machine once it is on the line. With this arrangement, if it were desired to keep different sets of embossing rolls on a common center line, when substituting fifty-two inch long embossing rolls for seventy-four inch long embossing rolls, piston rod 152 of assembly 22 would be extended 11 inches moving the carriage to the right. Of course, when substituting the fifty-two inch long embossing rolls for the seventy-four inch long embossing rolls, piston rod 152 would be retracted moving carriage 18 to the left.

While in the preferred form, hydraulic piston and cylinder assemblies are utilized to position carriage 18, other extensible pneumatic, mechanical, or electrical devices can be used to move the carriage.

What is claimed is:
1. In an embossing machine:
carriage means for facilitating movement of said embossing machine relative to other machines in a process line,
a headstock and a tailstock carried by said carriage, said headstock and said tailstock each having means for mounting embossing rolls thereon, and said headstock and said tailstock being movable relative to one another in a direction parallel to the longitudinal axes of said embassing rolls to accommodate sets of embossing rolls having differing lengths,
first means moving said carriage means onto and off of the process line,
second means for adjusting the position of the carriage in a direction parallel to the longitudinal axes of said embossing rolls to reset the operating position of said carriage means and said embossing machine relative to the other machines in said process line for different sets of embossing rolls, and
said first and second means being operatively interconnected with one of said means being affixed to an anchoring means and the other of said means being affixed to said carriage means whereby the actuation of either of said means will cause movement of said carriage means.
2. In the embossing machine of claim 1:
the headstock being rigidly secured to the carriage means in a fixed position, and
the tailstock being slidably carried by the carriage,
means to permit adjustment of the tailstock relative to the headstock.
3. In the embossing machine of claim 1:
one of said stocks being secured to the carriage means in a fixed position, the other of said stocks being slidably carried by said carriage means to permit the adjustment of the headstock relative to the tailstock in the direction parallel to the longitudinal axes of the embossing rolls.
4. In the embossing machine of claim 1:
said carriage means having a slotted member mounted thereon, the slots of said slotted member extending parallel to the longitudinal axes of the embossing rolls, and
means slidably securing one of said stocks to said slotted member.
5. In the embossing machine of claim 4:
said headstock being rigidly secured to said carriage means in a fixed position, and
said tailstock being slidably secured to said slotted member.
6. In the embossing machine of claim 1:
means for securely anchoring the carriage means in place once it has been reset in the desired operating position.
7. In an embossing machine:
a carriage,
a headstock and tailstock carried by said carriage, said headstock and said tailstock each having means for mounting embossing rolls thereon and said headstock and tailstock being movable relative to one another in a direction parallel to the longitudinal axes of said embossing rolls to accommodate sets of embassing rolls having differing lengths,
first extensible means for adjusting the position of the carriage in a direction parallel to the longitudinal axes of said embossing rolls to reset the operating position of the embossing machine relative to other machines in a process line for different sets of embossing rolls, said first extensible means being secured to an anchoring bracket and a coupling element, and
second extensible means for moving the carriage onto and off of the process line, said second extensible means being affixed to said carriage and secured to said coupling element to interconnect said first extensible means with said carriage and said second extensible means with said anchoring bracket whereby the extension or retraction of either of said extensible elements will cause movement of said carriage.
8. In the embossing machine of claim 7:
said first and second extensible means being hydraulic piston and cylinder assemblies.

References Cited
UNITED STATES PATENTS

| | | | |
|---|---|---|---|
| 675,024 | 5/1901 | Sonntag | 101—216 XR |
| 1,656,351 | 1/1928 | Greenleaf | 82—31 |
| 2,043,618 | 6/1936 | Havill | 308—15 XR |
| 2,681,611 | 6/1954 | Jacobs | 101—23 |
| 2,824,514 | 2/1958 | Johnson | 101—219 XR |
| 2,900,922 | 8/1959 | Edmonds | 104—162 |
| 2,931,340 | 4/1960 | White. | |
| 3,057,292 | 10/1962 | Larsen | 101—174 |
| 3,080,204 | 3/1963 | Lindhgren | 104—162 XR |
| 3,173,360 | 3/1965 | Hamilton | 101—216 XR |

ROBERT E. PULFREY, Primary Examiner

CLIFFORD D. CROWDER, Assistant Examiner

U.S. Cl. X.R.

60—97; 92—151; 101—216; 104—162